Dec. 14, 1937.     F. SCHMID     2,102,131
CHANGE SPEED MECHANISM
Filed Oct. 28, 1936     5 Sheets-Sheet 1
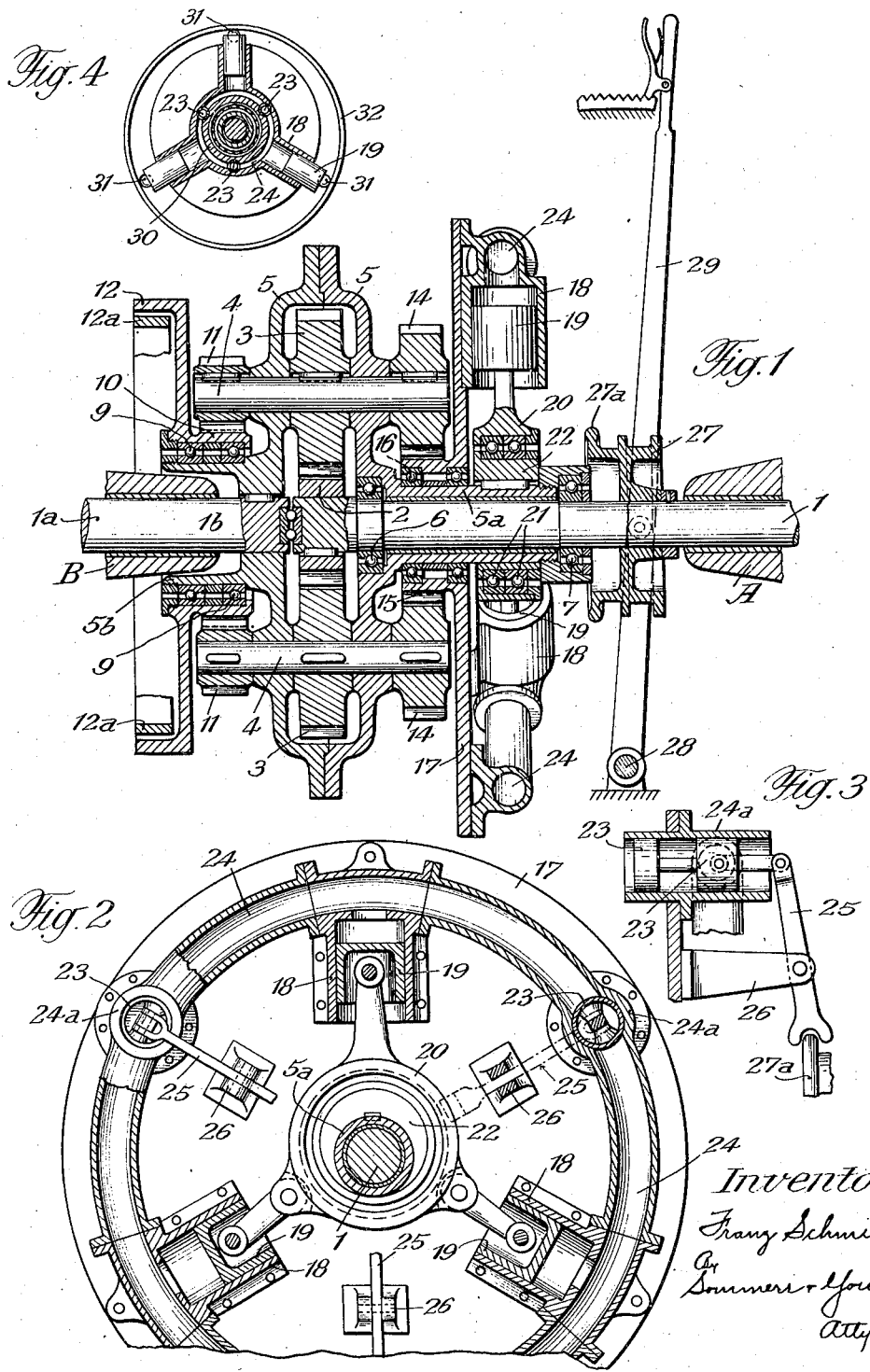

Dec. 14, 1937.                F. SCHMID                 2,102,131
                        CHANGE SPEED MECHANISM
                        Filed Oct. 28, 1936          5 Sheets-Sheet 2

Inventor:
Franz Schmid,
By Sommers & Young
        attys

Dec. 14, 1937.  F. SCHMID  2,102,131
CHANGE SPEED MECHANISM
Filed Oct. 28, 1936   5 Sheets-Sheet 3

Inventor:
Franz Schmid,
By Sommers & Young
Attys

Dec. 14, 1937.   F. SCHMID   2,102,131
CHANGE SPEED MECHANISM
Filed Oct. 28, 1936   5 Sheets-Sheet 4

Inventor:
Franz Schmid
By Sommers & Young
Attys

Dec. 14, 1937.  F. SCHMID  2,102,131
CHANGE SPEED MECHANISM
Filed Oct. 28, 1936  5 Sheets-Sheet 5
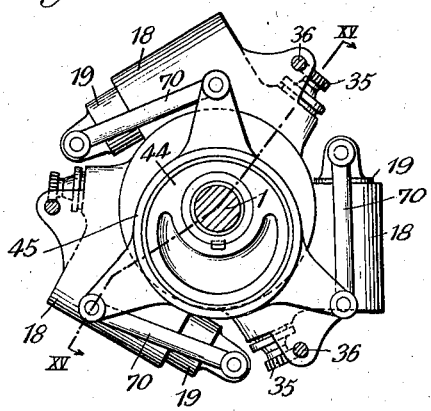
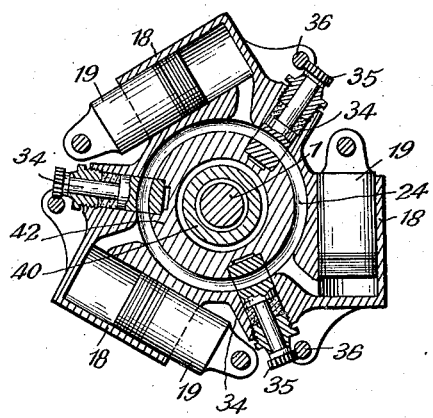
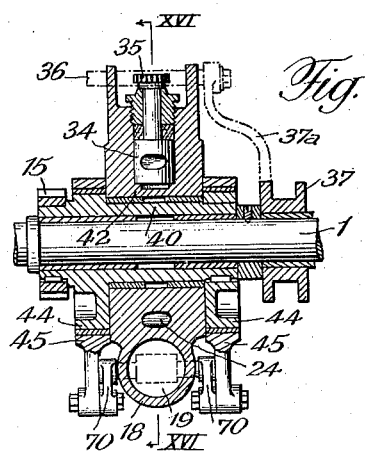
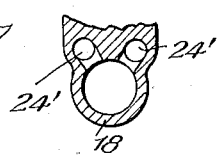
Inventor:
Franz Schmid
By Sommers-Young.
Attys Patented Dec. 14, 1937

2,102,131

UNITED STATES PATENT OFFICE 2,102,131

CHANGE SPEED MECHANISM

Franz Schmid, Lucerne, Switzerland

Application October 28, 1936, Serial No. 108,102
In Switzerland November 4, 1935

13 Claims. (Cl. 74—293)

This invention relates to change speed mechanisms that are devoid of predetermined speed stages and are particularly adapted for power vehicles, comprising planetary gears one of the central wheels of which is connected with the driving end and the planet wheel carrier is connected with the driven end of the mechanism, whereas the speed of a freely movable central wheel is regulatable by means of a fluid delivering piston operated pump, the amount of fluid flowing through the latter being varied.

The novel features of the change speed mechanism according to the invention consist in that each of the axles of the planet wheels meshing with the driving central wheel carries on each of its outer ends a further planet wheel, one part of these planet wheels meshing with a central wheel which is coaxial with the driving shaft and is firmly connected with a brake drum, whereas the remaining planet wheels mesh with the central wheel turning freely about the shaft and delivering the drive for external power consumption and being coaxially disposed with the driving shaft and connected with the pump turning together with the latter shaft and the cylinders of the pump being interconnected by means of an internally closed pressure fluid channel encompassing the driving shaft and having throttling members included therein.

In the accompanying drawings several embodiments of the invention are illustrated by way of example only in which Fig. 1 shows an axial longitudinal section of a first embodiment of the change speed mechanism;

Fig. 2 shows a vertical section of the oil pressure arrangement;

Fig. 3 is a view of a detail;

Fig. 4 is a sectional view of a modified oil pressure arrangement on a smaller scale;

Fig. 14 shows an elevation of the cylinder mounting of a fourth embodiment of the change speed mechanism;

Fig. 15 shows a section on the line XV—XV in Fig. 14;

Fig. 16 shows a section on the line XVI—XVI in Fig. 15, and

Fig. 17 shows a fragmentary axial section of a variant construction of the oil circulation channel.

Figure 5:
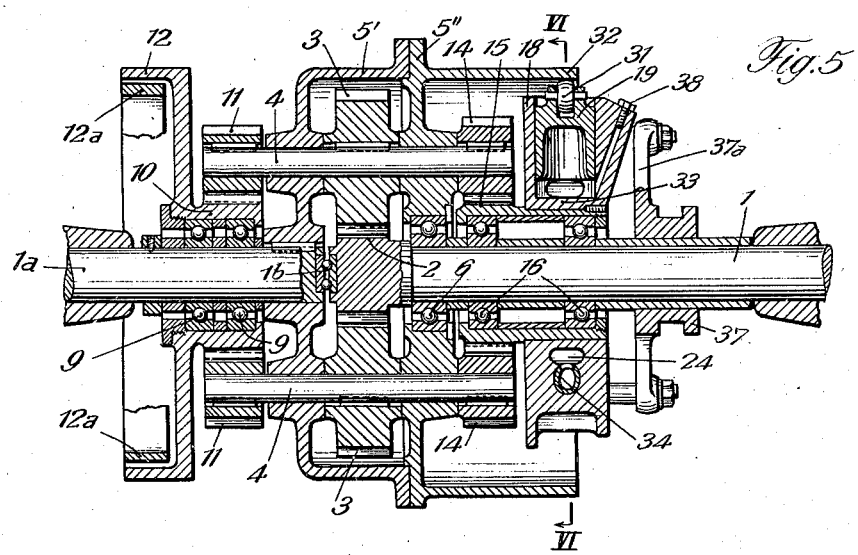
Fig. 5 shows a longitudinal section of a second embodiment of the change speed mechanism.
Figure 6:
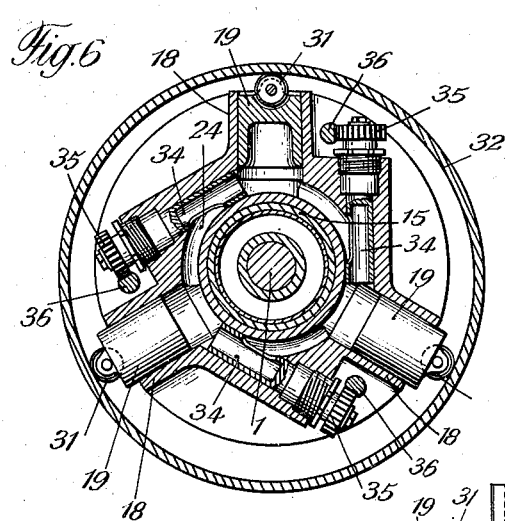
Fig. 6 shows a vertical section of the same on the line VI—VI of Fig. 5.
Figure 7:
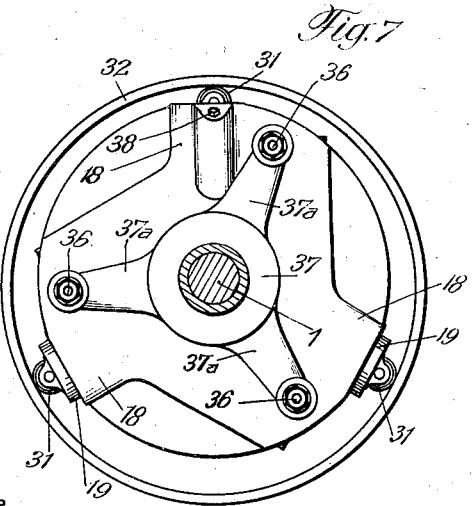
Fig. 7 is an end view as seen from the right in Fig. 5.
Figure 8:
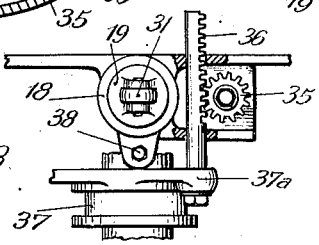
Fig. 8 is a view of a detail of this embodiment.

In the first embodiment of the change speed mechanism as shown in the Figs. 1 to 4, by 1 the driving shaft, for example, the motor shaft of a power vehicle, which is mounted at A, is designated. Coaxially therewith the driven shaft 1a is mounted at B. These two shafts abut on one another and are relatively centered by means of an intervening ball bearing. On the inner end of the driving shaft 1 a central wheel 2 is keyed which meshes with two or more planet wheels 3 which in turn are keyed on axles 4. In the present instance, these axles are mounted in a bipartite planetary gear box 5 which on one side is centered on the driving shaft 1 by a ball bearing 6 and on the other side is keyed to the driven shaft 1a. On the former side the planetary gear box 5 is provided with an elongated hub 5a which surrounds the shaft loosely and is centered thereon at the outer end by means of a ball bearing 7.

On the opposite side the planetary gear box 5 has a hub 5b on which the hub 10 of a brake drum 12 is mounted by means of ball bearings 9, the hub 10 forming together with an exterior toothed portion thereof a central wheel which is in mesh with planetary wheels 11 keyed on the rear ends of the axles 4 which ends project laterally from the box 5 towards the driven end of the mechanism. To the brake drum 12 a braking member, for example, in the form of a braking band or brake shoes 12a, is correlated. On the ends of the axles 4 projecting from the other side of the planetary gear box 5 towards the driving end of the mechanism, further planetary wheels 14 are keyed, which cooperate with a central wheel 15 mounted on the hub 5a for free rotation by means of ball bearings 16. The central wheel 15 forms the hub of a disc 17 which carries part of the pressure oil arrangement.

The latter is provided with three cylinders 18 which are spaced apart equal distances and connected to the disc in radial disposition and which slidingly engage plungers 19. The plunger rod of the upper plunger in the Figs. 1 and 2 is rigidly connected to an eccentric annular clip 20 to which the plunger rods of the other two plungers are pivotally connected. The eccentric clip is mounted by means of ball bearings 21 on an eccentric 22 fixed to the hub 5a. Each cylinder 18 communicates with an oil circulation channel 24 encompassing the driving shaft. Between each two cylinders in the oil circulation channel 24 a cross pipe stud 24a is inserted (Fig. 3) in which a control plug in the form of a twin piston 23 is displaceable, in such manner, that it can control the through-area of the oil circulation channel from the fully open to fully closed cross section of the latter. The control plug 23 is displaced by means of a two-armed lever 25 which engages with the guide rod of the plug and is mounted at its middle portion on the disc 17 by means of support 26 and which engages at its lower end with a guide ring 27a of a socket 27 loosely mounted on the shaft I for longitudinal displacement thereon (Fig. 1). The socket is engaged by a control lever 29 which is fulcrumed at 28 and which is rockable either directly by hand or by means of a linkage cooperating with its outer end.

With the change speed mechanism running at no-load, the control plugs 23 each occupy a position in which they clear the through area of cross section of the oil circulation channel completely, so that the pressure oil present in this channel can flow into and out of the cylinders 18 unhindered. By the driving effect of the shaft I the planet wheels 3 rotate in the box, when the shaft Ia is loaded, and consequently the planet wheels II and 14 on both sides of the box rotate also. In this way the central wheel 15 as well as the central wheel on the brake drum 12 are rotated. By rotation of the central wheel 15 together with the disc 17 the pressure oil arrangement gyrates, so that by means of the eccentric 22 the plungers are reciprocated unresisted.

When, thereupon, while the brake drum remains out of engagement with the brake shoes, by rocking the control lever 29, the control plugs 23 are shifted to throttle the oil circulation, by conjoint action of the plungers 19 and the eccentric 22, a braking effect is exerted on the planet wheels 14 via the central wheel 15, thereby causing these planet wheels to roll on the central wheel in the sense of advancing, in accordance with the amount of braking effort produced by the gyrating oil pumps. By this means, the box 5, which remains at standstill during the mechanism running at no-load (thus when the control plugs open), is rotated in unison and since the box is rigid with the driven shaft the latter rotates also. Depending upon the amount of braking effort produced by the oil pressure arrangement the driven shaft can be given any desired number of revolutions from zero up to a maximum at which the whole assembly rotates as a self-contained solid mass.

During backward driving the oil passages in the oil circulation channel 24 are completely opened by the plugs 23 and the brake drum 12 is arrested by means of the braking member. When the shaft I is driven, the planet wheels II roll on the central wheel on the drum 12 in the opposite sense of rotation to the shaft I. By this means, the casing 5 is driven together with the driven shaft Ia firmly connected thereto also in the sense of rotation opposite to that of the shaft I.

When driving downhill, and thus the drive is derived from the shaft Ia, the brake drum 12 is also braked. By effect of the driving action of the shaft Ia the planet wheels II roll on the central wheel on the brake drum 12, thereby actuating the planet wheels 14 and consequently also the oil pressure arrangement which can be regulated between its idling movement and standstill as mentioned above. When the drum 12 is firmly arrested and the oil circulation through the pressure oil arrangement is completely throttled, the vehicle would be at standstill. From this follows that the mechanism acts at the same time in a manner similar to that of a motor brake.

In the variant construction of the pressure oil arrangement, as shown in Fig. 4, the cylinders 18 are mounted on the hub 5a of the planetary gear box by means of a ring 30, including both the oil circulation channel and the control plugs 23, together with ball bearing means. On the box an annulus 32 eccentrically disposed to the common rotation axis of the cylinders is secured and the plungers 19 carry at their outer ends rollers 31 which ride on the eccentric annulus 32.

A similar embodiment of the mechanism is shown in the Figs. 5 to 8. In this embodiment the planetary gear is constructed substantially on the same principle as that described immediately above. This holds good also for the braking drum, whereas the planetary gear box and the oil pressure arrangement are varied in regard to construction.

The casing is not provided on both of its sides with elongated hubs, as described above, the central wheel 10 carrying the brake drum 12 being mounted directly on the driven shaft Ia through the intermediary of ball bearings 9. In a like manner, also the central wheel 15, which is extended to form a sleeve, is mounted directly on the driving shaft I by means of ball bearings 16. The box of the planetary gear is joined together of two flanged asymmetrical parts 5', 5", the latter being provided with a race ring 32 eccentrically disposed to the shaft I. The cylinders 18 of the pressure oil arrangement form together a radial cylinder arrangement 33 which is nonrotatably secured on the sleeve of the central wheel 15, the cylinder arrangement including the oil circulation channel interconnecting the cylinders. The plungers 19 are provided at their outer ends with rollers 31 by means of which they run interiorly on the race ring 32. The eccentricity of the race ring is commensurate with the stroke of the plungers.

For controlling the oil circulation, with each cylinder a rotary valve 34 is arranged in tangential relation to the oil circulation channel 24, the valves carrying gear wheels 35 at their outer ends. These gear wheels 35 are in mesh with racks 36 (Fig. 8) which are mounted on a wheel spider 37a provided on a socket 37 which surrounds the shaft I loosely for longitudinal displacement thereon. By displacing the socket 37 the racks 36 turn the gear wheels 35 and consequently also the rotary valves 34 in which way the oil circulation is throttled more or less. 38 refers to the closure bolt of the oil supply passage. This embodiment operates in exactly the same manner as that described for the first embodiment.

In the embodiment of the mechanism shown in the Figs. 9 to 13, the change speed mechanism is enclosed in a casing G in the bearings $L_1$ and $L_2$ of which the driving and the driven shafts are mounted. On the driven shaft Ia the hub 5n of the planetary gear box 5g is keyed. This hub 5n is surrounded by a sleeve 10b mounted in the bearing L₁ for rotation about said hub, the brake drum 12 being flanged to the outer sleeve end, which projects out of the casing G, and the inner sleeve end carrying the central wheel 10 which cooperates with planetary wheels 11 which are keyed to the rear ends of axles 4 mounted in the planetary gear box 5g.

On the end of the driving shaft 1, which is centered in the driven shaft 1a, a further central wheel 2 is keyed which meshes with planetary wheels 3 keyed on the middle portions of the axles 4. On the front ends of the axles 4, planetary wheels 14 are keyed which cooperate with a central wheel 15 which is keyed to the inner end of a sleeve 40 rotatably mounted on the driving shaft 1. For keeping this sleeve from shifting longitudinally, it abuts with its rear end on a collar 1b and with its front end on a set ring 41. On the sleeve 40 a cylinder mounting 42 is revolubly carried which is provided with three radially disposed cylinders 18.

Innermost on the cylinder mounting an oil circulation channel 24 (Fig. 10) is arranged which interconnects all the three cylinder spaces and in which for each cylinder a rotary valve 34 is included in tangential relation which can be turned relative to the respective cylinder by means of a pinion 35 and a rack, for regulating the oil supply. The racks 36 are arranged on arms 37a provided on a sliding socket 37 which is mounted on the driving shaft and is shiftable thereon by means of a guide fork 43 which can be controlled from outside through the medium of a linkage.

Figure 11:
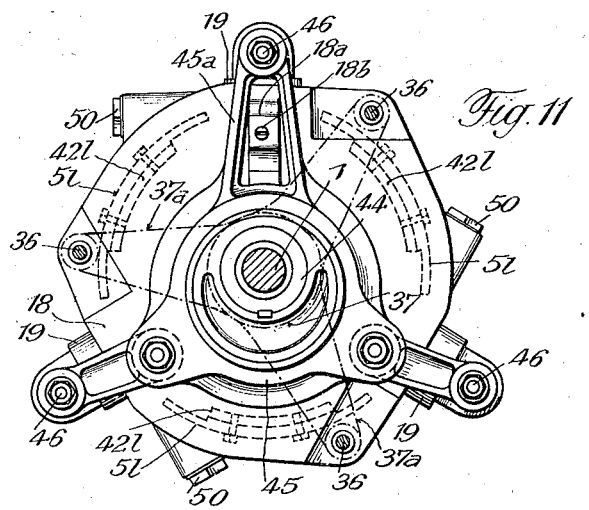
Fig. 11 is an elevation of the cylinder mounting.
Figure 12:
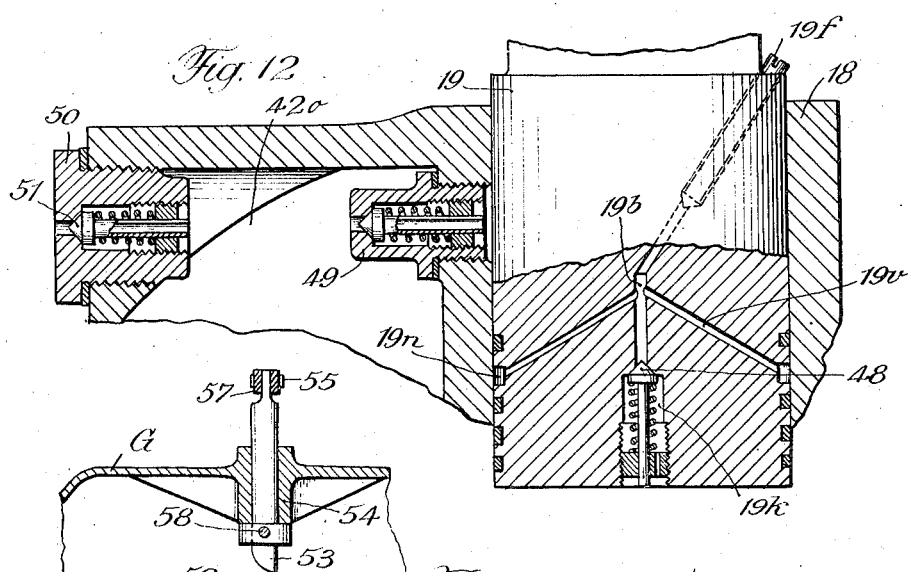
Fig. 12 shows a section of a plunger and the adjoining portion of the cylinder mounting.

On the sleeve 40, further, on both sides of the cylinder mounting, eccentrics 44 are keyed which are surrounded by annular eccentric clips 45 which are provided with arms 45a. These arms 45a engage with both ends of bolts 46 which are mounted in the outer plunger ends in transverse disposition thereto. The eccentricity of the eccentric 44 is chosen commensurate with the plunger stroke. The cylinder mounting is provided on its inner side with segmental lugs 42l which are overlapped by concentric projections 5l of the planetary gear box 5g (Fig. 11), screw bolts passed through the lugs and the projections effecting a rigid connection between the planet gear box and the cylinder mounting. For permitting supplying the cylinders with pressure oil, one of the cylinders is provided with a lateral projection 18a carrying a closure bolt 18b. This projection extends into an aperture of the overlying arm 45a of the respective eccentric clip, thus rendering the closure bolt accessible, as shown in Fig. 11.

From the foregoing the operation of this change speed mechanism is self-evident. The turning moment inherent to the driving shaft 1 is transmitted on the one hand by the various planetary gears to the driven shaft 1a and on the other hand to the sleeve 40 which effects the reciprocating movement of the plungers by means of the eccentrics, the annular eccentric clips, the arms of the latter and the transverse bolts of the plungers which movement is braked by action of the rotary valves 34 in accordance with the speed required, all as explained in connection with the embodiments previously described.

During the operation the pressure oil is permitted to escape by passing by the plungers in spite of the packing rings provided thereon, the accruing oil leakage losses being counteracted in the present instance by compensation measures.

Even the least oil leakage that may occur creates a detrimental vacuum in the oil circulation channel and in the cylinders and this unavoidable consequence is utilized in the present instance for eliminating the oil leakage losses. The measures applied are evident from the Figs. 10 and 12. Each plunger 19 is provided at a point some distance away from its inner end, which distance corresponds about to the length of its stroke, with an annular groove 19n, from which start communication passages 19v to extend towards an axial bore 19b which connects inwardly with a valve chamber 19k and continues outwardly to end in a bore which is closed by means of a closure bolt 19f. In the valve chamber 19k, a conical valve body 48 is inserted which is held in closed position by spring pressure. During the suction stroke of the plunger this valve opens when a vacuum happens to reign in the oil circulation channel 24 and the oil, which escaped during the compression stroke between the plunger and the cylinder wall and had collected in the passages of the plunger, can return past the valve into the oil circulation space.

In spite of these measures, in the course of time, some amount of oil leakage may arise due to wear on the plungers and the cylinders or to any other cause. With a view to avoiding this, an adequate oil reserve is provided. To this end, on the cylinder mounting oil chambers 42o are provided integral with the material thereof so as to be positioned between the cylinders. In the cylinder wall, approximately at the level occupied by the oil collecting groove 19n at the end of the suction stroke, a suction valve 49 is inserted through which the oil can flow from the chamber 42o into the cylinder incidental to an oil deficiency arising in the oil circulation through the cylinder mounting to the effect of acting through the valve 48 and the passages of the plunger on the suction valve 49, so as to open the latter. This arrangement has the effect that at first all the oil that has escaped is removed from the cylinder wall by suction action before fresh oil for replenishing is withdrawn from the supply chamber 42o. For introducing the oil each chamber 42o is provided with a closure bolt 50 into which an automatic suction valve 51 is inserted through which fresh oil for compensating any oil losses is drawn in.

When in the change speed mechanism last described a torque acts on the driven shaft in the opposite direction to that acting on the driving shaft, while the oil circulation is given free or is only partly throttled, there is no counteracting effect resisting this opposing torque. A peculiarity of the mechanism, consisting in the feature that the drive is transmitted from the driving to the driven shaft at a predetermined speed only after a certain amount of throttling of the oil circulation has taken place, thus requires, for example in applying the mechanism to power vehicles, that a locking device be provided for preventing backward rotation of the driven shaft, when the mechanism is set for forward driving.

Figure 9:
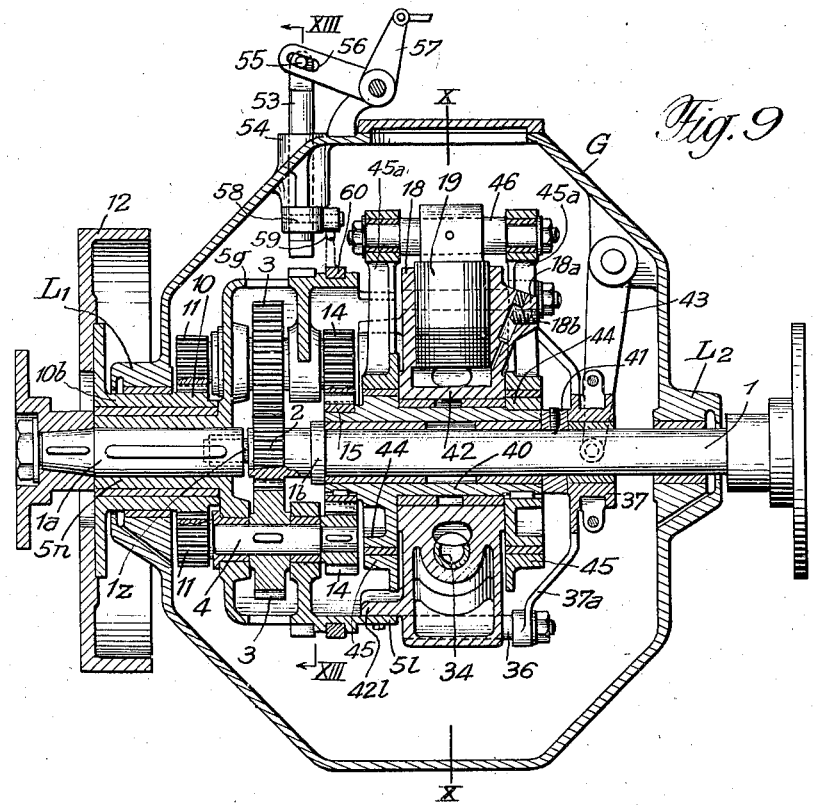
Fig. 9 shows a vertical section of a third embodiment of the change speed mechanism.
Figure 10:
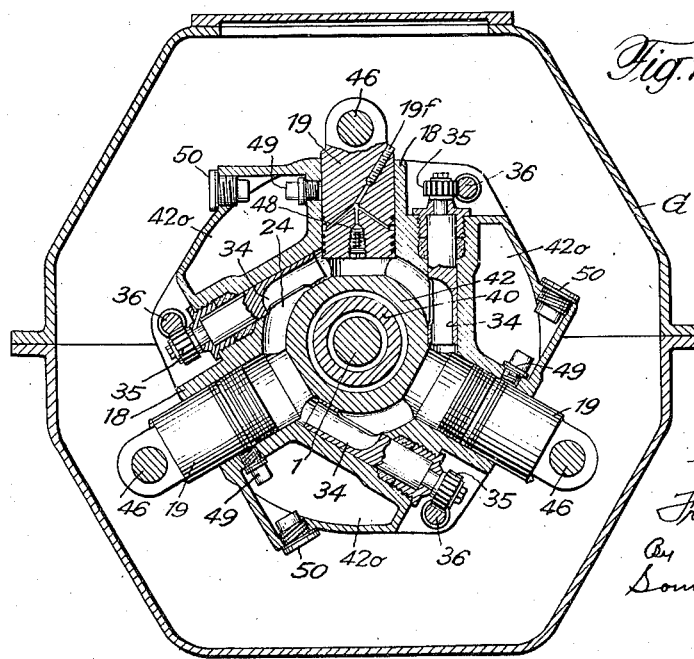
Fig. 10 shows a cross section on the line X—X in Fig. 9.
Figure 13:
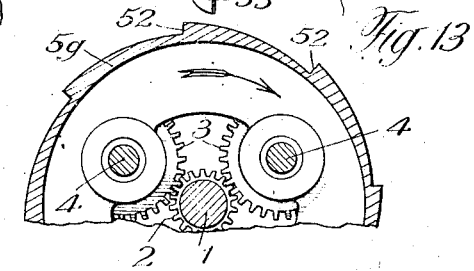
Fig. 13 shows a fragmentary section on the line XIII—XIII of Fig. 9.

Such a locking arrangement is illustrated in the Figs. 9 and 13. The planetary gear box 5g is provided with ratchet teeth 52 for cooperation with a locking bolt 53 which is displaceably arranged in a guide boss 54 of the planet gear box. The outer end of the bolt 53, which projects out of the casing G, engages by means of a pin 55 into a slot 56 of a bell crank lever 57 which at its other end is operatively connected with the hand control lever for backward driving by means of a linkage (not shown), in such manner, that, when the hand control lever is set for backward driving, the locking bolt is raised into the position as shown.

On a bearing pin 58 arranged on the locking bolt 53 one end of a connecting rod 59 is mounted the other end of which is pivoted to a sliding ring 60 which is inserted for rotation in an annular groove of the planet gear box 5g. The point of pivotal engagement of the rod 59 with the sliding ring 60 is shifted rearwardly relative to the locking bolt 53, as regards the direction of rotation for forward driving such as indicated by an arrow in Fig. 13, in such manner, that during forward driving and consequent rotation of the casing 5g in the direction of the arrow the locking bolt 53 is pushed upwardly by means of the connecting rod 59 by friction setting up between the box 5g and the sliding ring.

If, on the other hand, during forward driving, for example when the vehicle is run uphill, the box 5g begins to turn in the sense opposite to that indicated by the arrow the locking bolt 53, unless provided otherwise, is pulled down by means of the connecting rod 59, so as to enter into engagement with one of the ratchet teeth 52, in which way, by the locking device described, for example, unintentional backward running is prevented. If, however, backward driving is intended, that is, when the hand control lever is correspondingly re-adjusted, the locking device is released by the locking bolt 53 rising by means of the bell crank lever 57.

In the embodiment of the change speed mechanism shown in the Figs. 14 to 16, the cylinders 18 are arranged tangentially of the drive shaft 1. On both sides of the cylinder equipment an oil circulation channel 24 is provided to encompass the shaft. For controlling the oil circulation, in the channel 24, also in the present instance a rotary valve 34 is associated with each cylinder 18, the valves 34 being arranged at points of the circumference of the oil circulation channel between pairs of adjacent cylinders. The plungers are actuated by eccentrics 44 through the intermediary of annular three-armed eccentric clips 45 and connecting links 70. This construction has the advantage of economizing space, since the diameter of the change speed mechanism can be reduced by approximately one third of its length.

Alternatively, two oil circulation channels 24' can be provided one on each side of the cylinders 18, i. e., the working spaces thereof, as shown in Fig. 17.

I do not limit myself to the particular size, shape, number or arrangement of parts as shown and described, all of which may be varied without going beyond the scope of my invention as shown, described and claimed.

What I claim is:

1. In a change speed mechanism particularly for power vehicles, a drive shaft and a driven shaft having a common axis, a planetary gear, a central wheel in said gear driven by said drive shaft, a box receiving said gear connected to said driven shaft, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel concentric with said axis for cooperation with the other part of said further planetary wheels, a pressure fluid pumping arrangement concentric with said axis for speed control of said freely revoluble central wheel, a pressure fluid circulation channel surrounding said axis and interconnecting the cylinder spaces of said arrangement, and throttle means for controlling said channel.

2. In a change speed mechanism particularly for power vehicles, a drive shaft and a driven shaft having a common axis, a planetary gear, a central wheel in said gear driven by said drive shaft, a box receiving said gear, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel concentric with said axis for cooperation with the other part of said further planetary wheels, a pressure fluid pumping arrangement concentric with said axis for speed control of said freely revoluble central wheel, piston operated cylinders comprised by said arrangement, a pressure fluid circulation channel arranged to surround said axis and interconnecting said cylinders, sockets included in said channel between said cylinders, plug-like throttle members inserted in said sockets, and a shiftable control lever operatively connected with said members for regulating the flow of fluid through said channel.

3. In a change speed mechanism particularly for power vehicles, a drive shaft and a driven shaft having a common axis, a planetary gear, a central wheel in said gear driven by said drive shaft, a box receiving said gear, planetary wheels journaled in said box for cooperation with said driven central wheel, an elongated hub on said box, journal extensions on both sides of said planetary wheels, a further planetary wheel carried by each of said extensions, a brake controlled central wheel concentric with said axis for cooperation with part of said further planetary wheels, a freely revoluble central wheel concentric with said axis for cooperation with the other part of said further planetary wheels, a pressure fluid pumping arrangement concentric with said axis for speed control of said freely revoluble central wheel, piston operated cylinders comprised by said arrangement, a pressure fluid circulation channel arranged to surround said axis and interconnecting said cylinders, said cylinders and said channel being mounted on said elongated hub, and an annular eccentric clip connected with said box for actuating the pistons of said cylinders.

4. In a change speed mechanism particularly for power vehicles, a drive shaft and a driven shaft having a common axis, a planetary gear, a central wheel in said gear driven by said drive shaft, a box receiving said gear, planetary wheels journaled in said box for cooperation with said driven central wheel, a race ring provided on said box in eccentric relation to said axis, journal extensions on both sides of said planetary wheels, a further planetary wheel carried by each of said extensions, a brake controlled central wheel concentric with said axis for cooperation with part of said further planetary wheels, a freely revoluble central wheel directly mounted on said drive shaft for cooperation with the other part of said further planetary wheels, a drum-shaped sleeve on said freely revoluble central wheel, a pressure fluid pumping arrangement for speed control of said freely revoluble central wheel, piston operated cylinders comprised by said arrangement, a pressure fluid circulation channel arranged to surround said axis and interconnecting said cylinders, said cylinders being non-rotatably mounted on said sleeve as a radial cylinder unit, and rollers mounted on the outer ends of the pistons of said cylinder for running on said race ring.

5. In a change speed mechanism particularly for power vehicles, a drive shaft and a driven shaft having a common axis, a planetary gear, a central wheel in said gear driven by said drive shaft, a box receiving said gear, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel directly mounted on said drive shaft for cooperation with the other part of said further planetary wheels, a drum-shaped sleeve on said freely revoluble central wheel, a pressure fluid pumping arrangement for speed control of said freely revoluble central wheel, piston operated cylinders comprised by said arrangement, a pressure fluid circulation channel arranged to surround said axis and interconnecting said cylinders, said cylinders being non-rotatably mounted on said sleeve as a radial cylinder unit, rotary valves tangentially included in said channel between said cylinders, gear wheels on the outer ends of said valves, a wheel spider provided guide socket arranged for free rotation and displacement relative to said drive shaft, racks on said spider for cooperation with said gear wheels, for controlling said valves and regulating the fluid circulation by displacing said guide socket.

6. In a change speed mechanism particularly for power vehicles, a front drive shaft and a rear driven shaft having a common axis, a sleeve rotatably surrounding said driving shaft, a planetary gear, a central wheel in said gear driven by said drive shaft, a box receiving said gear, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels a freely revoluble central wheel fixed on the rear end of said sleeve, for cooperation with the other part of said further planetary wheels, a pressure fluid pumping arrangement for speed control of said freely revoluble central wheel, a block of piston operated cylinders comprised by said arrangement in concentric relation to said axis and having said box secured thereto, and an eccentric drive mounted on said sleeve and connected to the outer ends of the pistons of said cylinders.

7. In a change speed mechanism particularly for power vehicles, a front drive shaft and a rear driven shaft having a common axis, a sleeve rotatably surrounding said driving shaft, a planetary gear, a central wheel in said gear driven by said drive shaft, a box receiving said gear, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel fixed on the rear end of said sleeve, for cooperation with the other part of said further planetary wheels, a pressure fluid pumping arrangement for speed control of said freely revoluble central wheel, a block of piston operated cylinders comprised by said arrangement in concentric relation to said axis and having said box secured thereto, an eccentric fixed on both sides of said cylinder block, arm provided annular eccentric clips cooperating with said eccentrics, and a transverse bolt connected to each end of said pistons of said cylinders, said arms on said clips engaging said bolts in pairs.

8. In a change speed mechanism particularly for power vehicles, a front drive shaft and a rear driven shaft having a common axis, a sleeve rotatably surrounding said driving shaft, a planetary gear, a central wheel in said gear driven by said drive shaft, a box receiving said gear, concentric projections on said box, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel fixed on the rear end of said sleeve, for cooperation with the other part of said further planetary wheels, a pressure fluid pumping arrangement for speed control of said freely revoluble central wheel, a block of piston operated cylinders comprised by said arrangement in concentric relation to said axis, segmental lugs provided on the rear side of said cylinder block for overlapping engagement with said projections on said box, connection bolts passed through adjacent jugs and projections, an eccentric fixed on both sides of said cylinder block, arm provided annular eccentric clips cooperating with said eccentrics, and a transverse bolt connected to each end of said pistons of said cylinders, said arms on said clips engaging said bolts in pairs.

9. In a change speed mechanism particularly for power vehicles, a front drive shaft and a rear driven shaft having a common axis, a sleeve rotatably surrounding said driving shaft, a planetary gear, a central wheel in said gear driven by said drive shaft, a box receiving said gear, an elongated hub on said box fixed to said driven shaft, a casing enveloping said box, a bearing sleeve provided in said casing surrounding said hub, planetary wheels journaled in said box for cooperation with said driven central wheel, journal extensions on both sides of said planetary wheels, a further planetary wheel carried by each of said extensions, a central wheel concentric with said axis for cooperation with part of said further planetary wheels fixed to the inner end of said bearing sleeve, a brake drum fixed to the outer end of said bearing sleeve projecting out of said casing, a freely revoluble central wheel concentric with said axis for cooperation with the other part of said further planetary wheels, a pressure fluid pumping arrangement for speed control of said freely revoluble central wheel, and a block of piston operated cylinders comprised by said arrangement in concentric relation to said axis and having said box secured thereto.

10. In a change speed mechanism particularly for power vehicles, a front drive shaft and a rear driven shaft having a common axis, a sleeve rotatably surrounding said driving shaft, a planetary gear, a central wheel in said gear driven by said drive shaft, a box receiving said gear, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel fixed on the rear end of said sleeve, for cooperation with the other part of said further planetary wheels, a pressure fluid pumping arrangement for speed control of said freely revoluble central wheel, a block of piston operated cylinders comprised by said arrangement in concentric relation to said axis and having said box secured thereto, a pressure fluid circulation channel surrounding said axis and interconnecting the cylinder spaces, a suction valve having a valve chamber provided on the inner end of the piston of each cylinder, an annular groove on the circumference of each piston, and passages interconnecting said chamber with said groove for collecting escaping pressure oil from said cylinder spaces and returning the same through said suction valve into said channel.

11. In a change speed mechanism particularly for power vehicles, a front drive shaft and a rear driven shaft having a common axis, a sleeve rotatably surrounding said driving shaft, a planetary gear, a central wheel in said gear driven by said drive shaft, a box receiving said gear, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel fixed on the rear end of said sleeve, for cooperation with the other part of said further planetary wheels, a pressure fluid pumping arrangement for speed control of said freely revoluble central wheel, a block of piston operated cylinders comprised by said arrangement in concentric relation to said axis and having said box secured thereto, a pressure fluid circulation channel surrounding said axis and interconnecting the cylinder spaces, pressure oil chambers arranged on said block of piston operated cylinders between the latter, an automatic air inlet valve provided on each of said chambers, suction valves connecting said chambers with said cylinders, for replenishing any deficiency of pressure oil in said channel through said suction valves.

12. In a change speed mechanism particularly for power vehicles, a front drive shaft and a rear driven shaft having a common axis, a sleeve rotatably surrounding said driving shaft, a planetary gear, a central wheel in said gear driven by said drive shaft, a box receiving said gear connected to said driven shaft, a locking device cooperating with the driven end of the mechanism so as to prevent said end from rearward rotation when the mechanism operates for forward running, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel fixed on the rear end of said sleeve, for cooperation with the other part of said further planetary wheels, a pressure fluid pumping arrangement for speed control of said freely revoluble central wheel, a block of piston operated cylinders comprised by said arrangement in concentric relation to said axis and having said box secured thereto, and an eccentric drive mounted on said sleeve and connected to the outer ends of the pistons of said cylinders.

13. In a change speed mechanism particularly for power vehicles, a front drive shaft and a rear driven shaft having a common axis, a sleeve rotatably surrounding said driving shaft, a planetary gear, a central wheel in said gear driven by said drive shaft, a box receiving said gear connected to said driven shaft, ratchet teeth on said box, a locking bolt occupying a released position when the mechanism operates for rearward running cooperating with said ratchet teeth, a sliding ring mounted on said box, a link interconnecting said bolt and said ring, planetary wheels journaled in said box for cooperation with said driven central wheel, journal extensions on both sides of said planetary wheels, a further planetary wheel carried by each of said extensions, a brake controlled central wheel concentric with said axis for cooperation with part of said further planetary wheels, a freely revoluble central wheel, fixed on the rear end of said sleeve, for cooperation with the other part of said further planetary wheels, a pressure fluid pumping arrangement for speed control of said freely revoluble central wheel, a block of piston operated cylinders comprised by said arrangement in concentric relation to said axis and having said box secured thereto, and an eccentric drive mounted on said sleeve and connected to the outer ends of the pistons of said cylinders.

FRANZ SCHMID.